United States Patent Office 3,312,824
Patented Apr. 4, 1967

3,312,824
SELF-COMPENSATING SPECTROMETER INCORPORATING A DIFFRACTION GRATING
Alan Hugh Cook, Teddington, Middlesex, England, assignor to National Research Development Corporation, London, England, a corporation of Great Britain
Filed Oct. 18, 1963, Ser. No. 317,354
Claims priority, application Great Britain, Oct. 22, 1962, 39,960/62
9 Claims. (Cl. 250—203)

The present invention relates to spectrometers employing a diffraction grating as the dispersing element and its purpose is to improve the resolution of the instrument where irregular movements of small amplitude occur in the apparent source of light under examination, without reduction of sensitivity. Such movements arise for example in astronomical spectroscopy where a small image of a star formed by a telescope is in irregular motion with an amplitude of for example 10 seconds of arc due to imperfections in the stabilisation of an artificial satellite carrying the telescope or due to scintillation in the case of a ground telescope.

If the wandering of the image is allowed for by providing the spectrometer with a wide entrance slit the resolution of the instrument will be poor while if the slit is made narrow the image will frequently not fall in it and the integrated amount of light transmitted by the instrument will be low and fluctuate irregularly.

According to the present invention an entrance slit wide enough to accommodate the excursions of the apparent source of light is used but the effects at the point at which the intensity of the diffracted image is measured caused by the excursions of the apparent light source within the limits imposed by the entrance slit are substantially completely compensated by deriving from an undiffracted image, a signal varying with lateral movements of the apparent source of light and applying this signal to compensating means. Such means may serve to displace the diffracted image or an electron beam derived therefrom in relation to an exit slit or to displace an exit slit laterally so that it remains substantially co-incident with the position of the diffracted image. The actual measuring means incorporates a photo-electric device and the effect of laterally shifting the exit slit where that method is used is quite negligible in its effect on the measuring means since the lateral movements are minute while the photoelectric device is of substantial width.

Conveniently the movements of the undiffracted image due to excursions of the apparent light source are arranged to provide a control signal for a servo control circuit which is arranged to apply similar corrections both to the undiffracted image and to the diffracted image.

An additional independent signal may be superimposed at least on the means for applying compensation to the diffracted image which enables a scan according to wave length to be effected and in that case measurement of the intensity of the diffracted image and of the independent signal may be simultaneously recorded so that the variation of intensity of wave length can be ascertained from the record.

The invention will be further described with reference to the accompanying diagrammatic drawings in which FIGURE 1 is a diagrammatic plan view illustrating the principles on which one embodiment of the invention operates.

Figure 1:
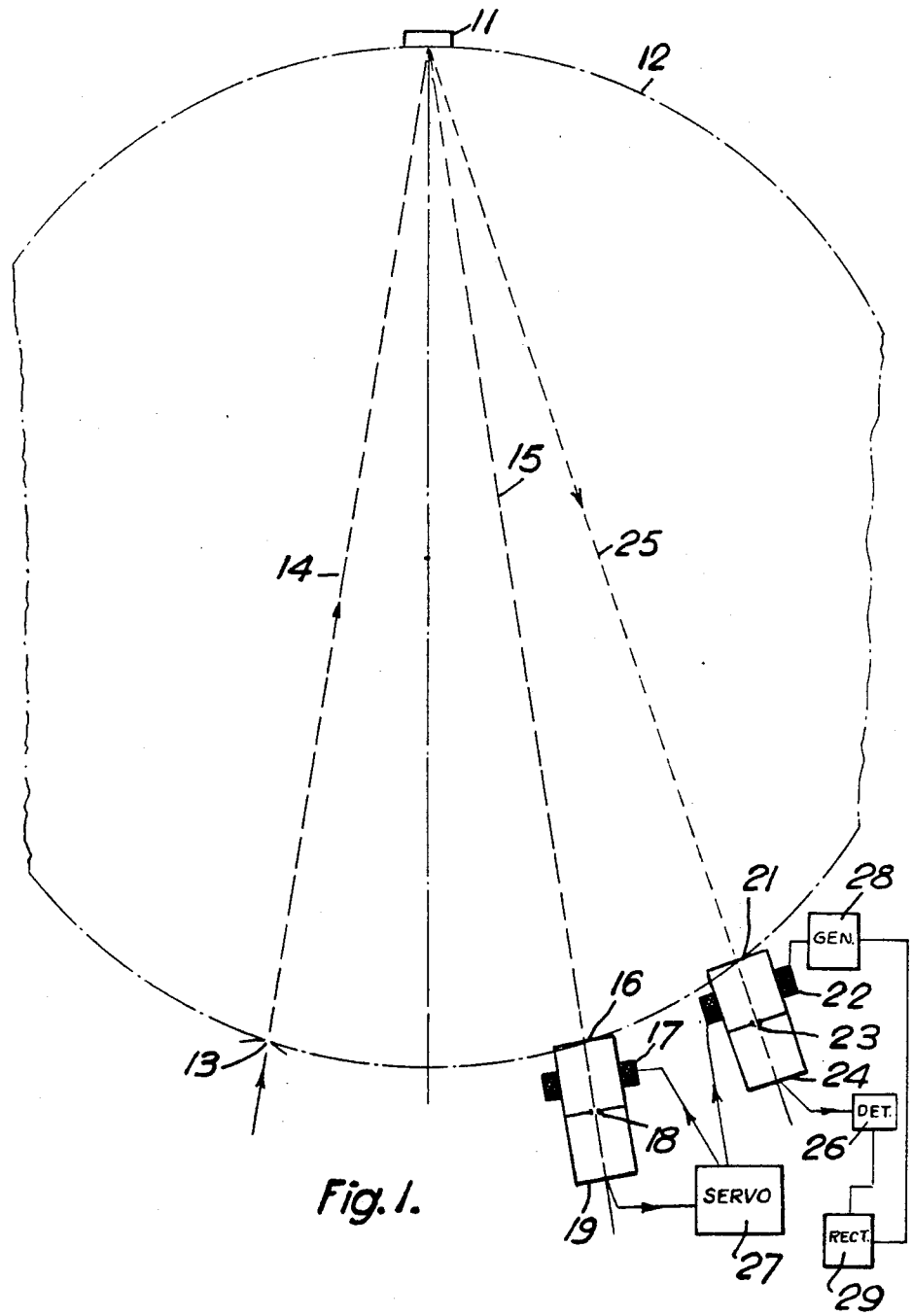

Referring first to FIGURE 1, rays from a star or similar object collected by an optical element not shown e.g. an objective lens or a concave mirror are directed on to a diffraction grating of the reflecting type indicated at 11. The grating has a surface of circular contour whose centre lies on the Rowland circle 12 and on this circle is also located an entrance slit 13 on which the rays are brought to a focus and enter along the path 14. The slit 13 is located to one side of the normal to the grating at the point of incidence i.e. to one side of the diameter of the circle 12 so that the undiffracted reflected ray passes along the path 15. The entrance slit is made wide enough to accommodate small excursions of the image.

Located on the circle 12 where the ray 15 intersects it, is the photo-cathode 16 of a photo-electric position-sensitive tube, the cathode 16 being normal to the ray 15. The tube incorporates a deflecting coil 17, an electron slit 18 and an electron-sensitive surface 19 which produces a signal when the beam of electrons falls on it.

A similar photo-electric position-sensitive tube comprising a photo-cathode 21, deflecting coil 22, electron slit 23 and sensitive surface 24 has its cathode 21 located on the circle 12 at the point at which a diffracted ray 25 of the selected order, usually the first from the grating 11 intersects the circle.

The signal from the surface 24 passses to a detector 26. The signal from the surface 19 passes to a servo-mechanism 27 which supplies exciting current to both deflecting coils 17 and 22.

If the entering ray along the path 14 moves within a small angle depending on the width of the slit 13, the undiffracted ray 15 will similarly move in relation to the photo-cathode 16 but this if uncorrected would vary the strength of the electron beam passing through the slit 18 and thus the signal produced by the surface 19. The servo-mechanism 27 is designed to apply a correcting signal to the coil 17 to bring the electron beam back into the slit 18. Since the diffracted ray along the path 25 undergoes precisely corresponding displacements to those of the undiffracted ray 15 the servo-mechanism signal applied to the coil 22 will also keep the electron beam in the tube 21, 22, 23, 24 centred in the slit 23. Accordingly although the slit 13 is made wide enough to accommodate excursions of the entering ray, the ray falling on the surface 24 is kept approximately centred and the slits 18, 23 can be kept narrow thus giving the instrument high resolution notwithstanding the width of the slit 13.

The above description applies to a ray of some selected wave length. By applying an additional independently controlled signal from a generator 28 to the coil 22 a scan according to wave length can be effected and this can be recorded by the same recorder 29 by which the signal detected by the circuit 26 is recorded.

Figure 2:
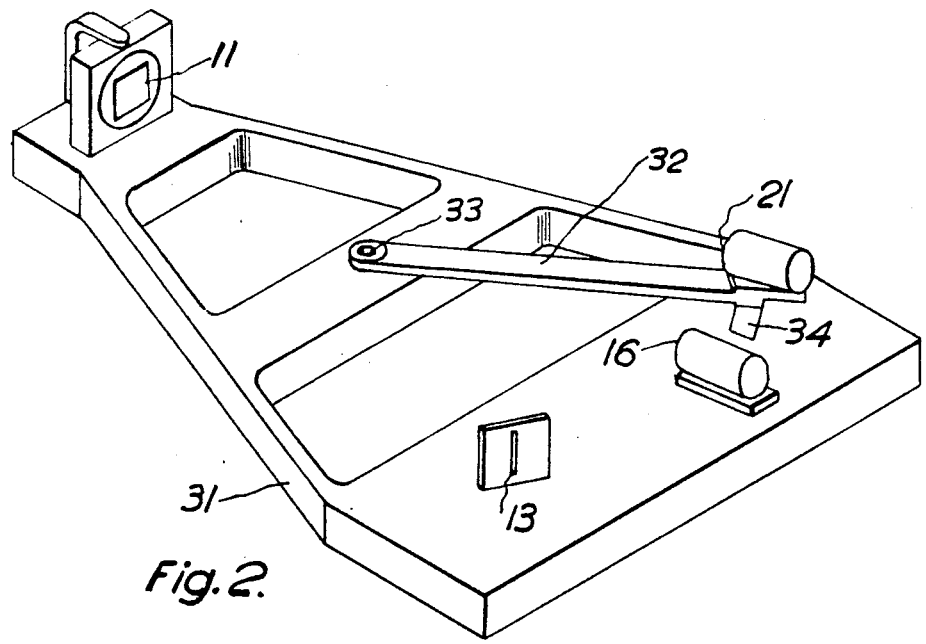
FIGURE 2 is a perspective view showing the form which apparatus operating as in FIGURE 1 may take.

FIGURE 2 shows how a spectrometer on the principles above described with reference to FIGURE 1 can be given practical embodiment. The grating 11 is mounted on a base 31. On the same base are fixed the entrance slit 13 upon which the image of the source is focussed for example by a telescope, and the photo-cathode 16 of the tube which receives the undiffracted image. The tube having the photo-cathode 21 which receives the diffracted image is mounted on an arm 32 pivoted at 33 at the centre of the Rowland circle, a track 34 being provided over which the arm can be adjusted to bring the tube which receives the diffracted image into the correct position. The tube is directed towards the grating 11 but since the position it needs to take is known to a quite close approximation it can usually be fixed on the arm 32. If for any reason a larger adjustment is desired this tube can be pivoted to the arm to enable it to be directed correctly in relation to the grating 11 notwithstanding the adjustment of the arm 32.

Figure 3:
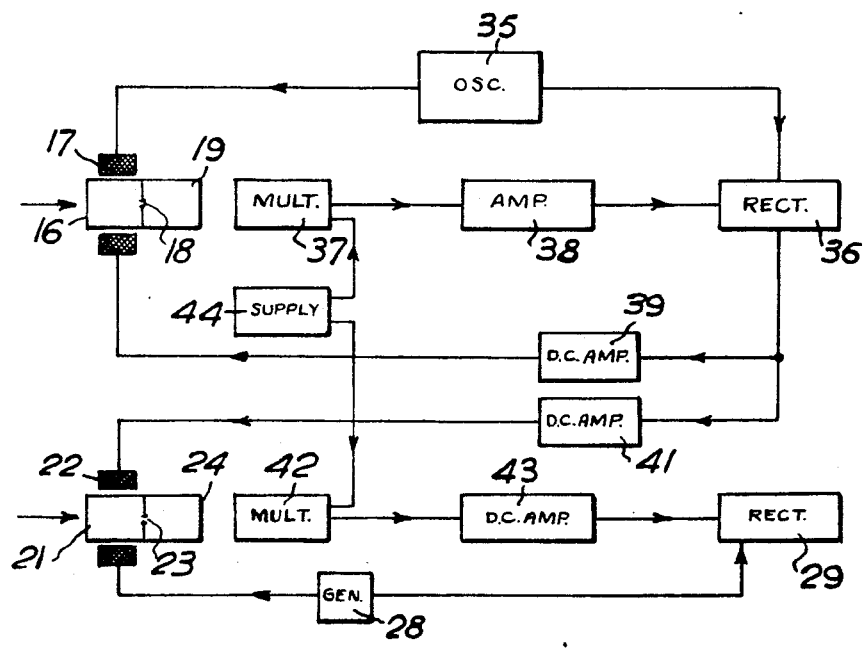
FIGURE 3 is a block circuit diagram relating to FIGURES 1 and 2.

FIGURE 3 shows how the circuit indicated in FIGURE 1 may be set up. To simplify the circuitry an oscillator 35 having a frequency of say 300 cycles per second supplies a modulating current to the deflecting coil 17 and also provides the necessary supply for a phase-sensitive rectifier 36. The light signal produced on the surface 19 excites a photo-multiplier 37, the excitation being modulated at the frequency of the oscillator 35. The output of the photo-multiplier 37 is amplified at 38 and the amplified signal is fed to the rectifier 36 which accordingly furnishes a voltage proportional to the displacement of the undiffracted image. This voltage is taken to two D.C. amplifiers 39, 41 the outputs of which are supplied respectively to the deflecting coil 17 and the deflecting coil 22 in such direction as to deflect the radiation from the photo-cathodes 16, 21 respectively towards the slits 18, 23. The intensity of the diffracted image is measured by the aid of a photo-multiplier 42, a D.C. amplifier 43 and the instrument or recorder 29. A common power supply for the photo-multipliers 37, 42 is indicated at 44.

Figure 4:
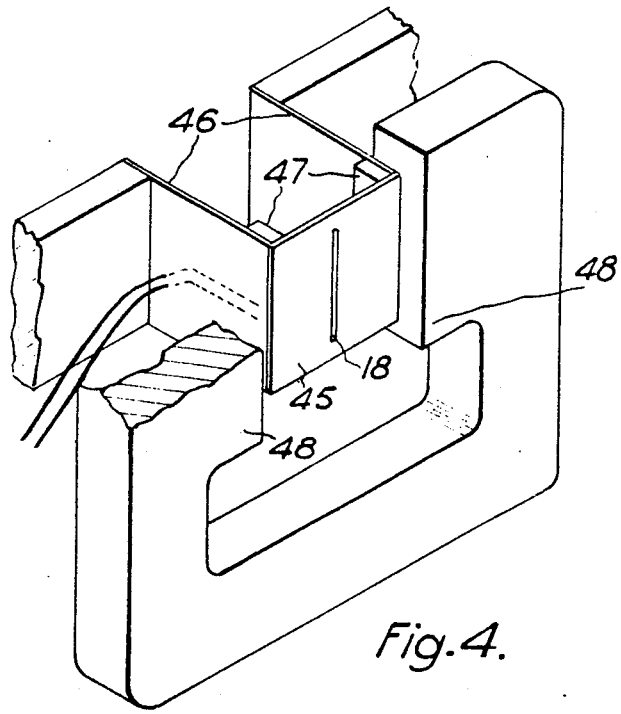
FIGURE 4 is a perspective view of part of another embodiment in which electro-mechanical correction is used and FIGURE 5 is a block circuit diagram relating to FIGURE 4.

The embodiment of FIGURES 1 and 2 employs photoelectric controls and it acts by deflecting the beam in relation to a stationary slit to compensate for the excursions for the apparent source of light. Instead photomechanical methods may be used in which case it is more convenient to move the exit slit laterally to effect compensation and FIGURE 4 shows how this may be done electro-magnetically. This figure only illustrates the exit slit 18 but exactly the like construction will be used for the exit slit 23.

Figure 5:
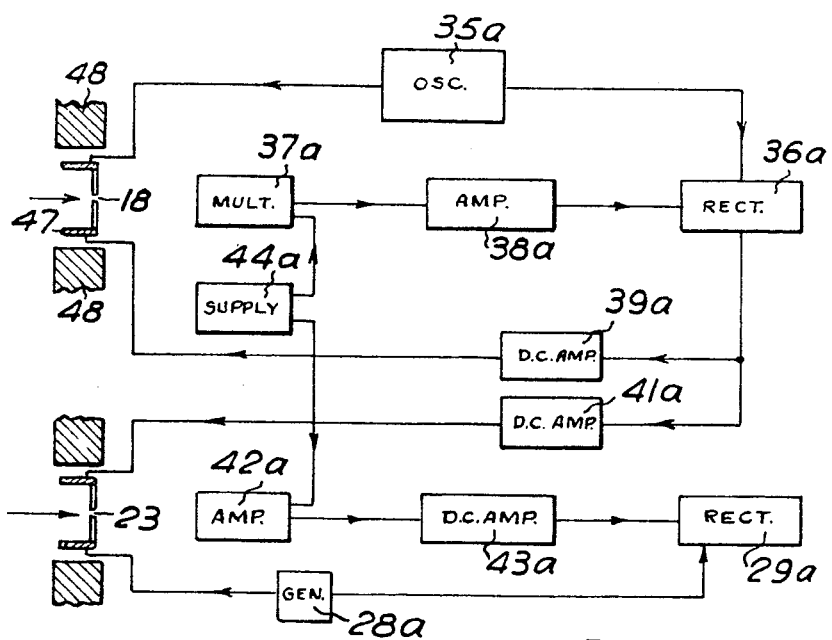

The slit 18 is formed in a member 45 which is mounted by the aid of parallel spring strips 46 so that it can move in its own plane carrying the slit laterally when it moves. The strips also carry a coil 47 working in the gap between two opposite magnetic poles 48 for example of a permanent magnet, the displacement of the coil being such as to cause the member 45 to be displaced laterally when a current passes through the coil. This embodiment operates in an analogous manner to that of FIGURES 1 and 2 and the corresponding circuit is shown in FIGURE 5 corresponding elements being given the same references with the suffix a. Since there is a mechanical system involved it is desirable that the oscillator 35a should operate at a lower frequency than that of FIGURE 4. For example 100 cycles per second is suitable.

It would be possible to substitute electrostatic displacement of the slits for electro-magnetic displacement. Each slit would still be mounted on parallel spring strips but instead of being equipped with a coil would be equipped with an insulated plate to which the oscillator and D.C. amplifier would be connected and this would co-operate with stationary electrodes. The principles of operation are well-known from such instruments as the quadrant electro-meter.

Precise details of the circuits indicated by the block diagrams are not given because in themselves they do not form part of the present invention. Details of such circuits are in themselves well-known. Similarly the construction of the various slits, grating, photo electric position-sensitive tubes and also mountings permitting controlled lateral displacement of a slit and its oscillation are also well-known as are the means for collecting the rays from the source and focussing them on the slit 13.

What I claim is:

1. A spectrometer incorporating a diffraction grating as the dispersing element, an entrance slit wide enough to accommodate excursions of small amplitude of an apparent point source of light, means for applying collimated light from said source to said entrance slit, a photo-electric position sensitive means for receiving an undiffracted image, means for deriving therefrom a signal varying with lateral movements of the apparent source of light, receiving means for receiving a diffracted image, measuring means for measuring the intensity of the diffracted image at the receiving means, and compensating means actuated by said signal for substantially completely compensating for the effects of the said excursions of the apparent light source on the said receiving means at the point where the measuring means measures the intensity of the diffracted image, within the limits imposed by said entrance slit.

2. A spectrometer as set forth in claim 1 in which said measuring means and said compensating means include a servo controlled circuit and means connected thereto for deflecting the position of the diffracted image.

3. A spectrometer as set forth in claim 2 in which said photo-electric position-sensitive device is a first photoelectric position-sensitive tube having a photo-cathode, deflecting means and an exit slit, the means for receiving the diffracted image is a second photo-electric position-sensitive tube having a photo-cathode, deflecting means and an exit slit, said servo control circuit being controlled by the output signal from said first tube and having its output connected to the deflecting means of both said tubes in such direction as to cause the electron beam in the first tube to be centred substantially on the exit slit of that tube and cause a corresponding deflection of the electron beam in the second tube.

4. A spectrometer as set forth in claim 3 also including means for supplying an independently varying signal to the deflecting means of said second tube thereby to displace the diffracted image laterally and effect a scan according to wave length.

5. A spectrometer as set forth in claim 1 in which said means for receiving the undiffracted image includes a first laterally movable slit at the image position and a first electro-mechanical means for moving said slit laterally, said means for receiving the diffracted image includes a second laterally movable slit at the image position and a second electro-mechanical means for moving said second slit laterally, and said means for deriving a signal and for compensating for the movements of the diffracted image includes photo-electric means behind said first laterally movable slit and a servo control circuit to which the output of said photo-electric means is supplied and the output of which is applied to both said electro-mechanical means in such direction as to displace the respective slits towards the positions of the respective images.

6. A spectrometer as set forth in claim 4 in which both said electro-mechanical means includes a laterally movable support for the respective slit, a stationary structure and electromagnetic means for displacing the movable support in relation to the stationary structure.

7. A spectrometer according to claim 4 in which both said electro-mechanical means include a laterally movable support for the respective slit, a stationary structure and electrostatic means for displacing the movable support in relation to the stationary structure.

8. A spectrometer as set forth in claim 1 also including signal-actuated image displacing means, a source of independently varying scanning signals for supplying an independently varying signal from said source to said signal-actuated image displacing means thereby to displace the diffracted image laterally, and effect a scan according to wave length.

9. A spectrometer as set forth in claim 8 also including means for simultaneously recording the intensity of the diffracted image and the independent lateral displacement thereof.

References Cited by the Examiner

UNITED STATES PATENTS

| | | | |
|---|---|---|---|
| 2,837,959 | 6/1958 | Saunderson et al. | 88—14 |
| 2,937,561 | 5/1960 | Saunderson et al. | 250—203 |
| 3,222,930 | 12/1965 | Smith | 88—14 |
| 3,229,566 | 1/1966 | Hutchinson et al. | 250—226 X |

RALPH G. NILSON, *Primary Examiner.*

J. D. WALL, *Assistant Examiner.*